(12) United States Patent
Oduro

(10) Patent No.: US 12,285,714 B2
(45) Date of Patent: Apr. 29, 2025

(54) ROBUST AND SUSTAINABLE CHEMICAL TREATMENT FOR SULFUR CONTAMINANTS IN FEED NATURAL GAS

(71) Applicant: SAUDI ARABIAN OIL COMPANY, Dhahran (SA)

(72) Inventor: Harry Daniel Oduro, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 960 days.

(21) Appl. No.: 17/374,652

(22) Filed: Jul. 13, 2021

(65) Prior Publication Data

US 2023/0027117 A1 Jan. 26, 2023

(51) Int. Cl.
| | |
|---|---|
| *B01D 53/02* | (2006.01) |
| *B01J 20/02* | (2006.01) |
| *B01J 20/08* | (2006.01) |
| *B01J 20/28* | (2006.01) |
| *B01J 20/30* | (2006.01) |

(Continued)

(52) U.S. Cl.
CPC .......... *B01D 53/02* (2013.01); *B01J 20/0244* (2013.01); *B01J 20/08* (2013.01); *B01J 20/28014* (2013.01); *B01J 20/3085* (2013.01); *B01J 20/3204* (2013.01); *B01D 2253/1124* (2013.01); *B01D 2253/25* (2013.01); *B01D 2256/24* (2013.01); *B01D 2257/304* (2013.01); *B01D 2257/306* (2013.01); *B01J 2220/4806* (2013.01); *B82Y 30/00* (2013.01)

(58) Field of Classification Search
CPC . B01D 53/02; B01J 20/02; B01J 20/08; B01J 20/28; B01J 20/30; B01J 20/32
See application file for complete search history.

(56) References Cited

U.S. PATENT DOCUMENTS

| | | |
|---|---|---|
| 4,003,827 A | 1/1977 | Carlson et al. |
| 5,354,453 A | 10/1994 | Bhatia |

(Continued)

FOREIGN PATENT DOCUMENTS

| | | |
|---|---|---|
| CA | 2 660 136 C | 1/2012 |
| CN | 101559353 A | 10/2009 |

(Continued)

OTHER PUBLICATIONS

Ghanbari, K. et al., "Design of Caustic Wash System for Light Hydrocarbons Such as LPG, NGL and Naphtha"; Petroleum and Coal; vol. 45, Issue 3-4; pp. 131-134; 2003 (4 pages).

(Continued)

*Primary Examiner* — Sharon Pregler
(74) *Attorney, Agent, or Firm* — Osha Bergman Watanabe & Burton LLP

(57) ABSTRACT

A method for removing contaminants from a gas stream including contacting a gas stream comprising hydrocarbons and sulfur contaminants with a modified nanocomposite adsorbent. Also provided are compositions and processes for forming compositions of a modified nanocomposite adsorbent composition for removing sulfur contaminants from a hydrocarbon stream. Additionally, provided is system for removing sulfur impurities from a gaseous hydrocarbon stream, where the system includes a plurality of adsorbent vessels arranged in series, where the adsorbent vessels include an emulsion of a modified nanocomposite adsorbent composition.

10 Claims, 5 Drawing Sheets

(51) Int. Cl.
  *B01J 20/32* (2006.01)
  *B82Y 30/00* (2011.01)

(56) References Cited

U.S. PATENT DOCUMENTS

| | | | |
|---|---|---|---|
| 5,510,568 | A | 4/1996 | Hearn |
| 5,683,574 | A | 11/1997 | Mazgarov et al. |
| 6,531,053 | B2 | 3/2003 | Khare |
| 7,001,504 | B2 | 2/2006 | Schoonover |
| 7,776,300 | B2 | 8/2010 | Ripperger |
| 8,308,848 | B1 | 11/2012 | Alptekin et al. |
| 8,623,308 | B2 | 1/2014 | Carlsson et al. |
| 9,421,516 | B2 * | 8/2016 | Alhooshani ........ B01J 20/28071 |
| 9,453,174 | B2 | 9/2016 | Acikgoz et al. |
| 2001/0050245 | A1 | 12/2001 | Hearn et al. |
| 2006/0131216 | A1 | 6/2006 | Scheirer et al. |
| 2011/0014105 | A1 | 1/2011 | Potter et al. |
| 2012/0000855 | A1 | 1/2012 | Bazer-Bachi et al. |
| 2012/0010306 | A1 | 1/2012 | Chiche et al. |

FOREIGN PATENT DOCUMENTS

| | | | | |
|---|---|---|---|---|
| CN | 105797686 | A | | 7/2016 |
| CN | 106881127 | A | | 6/2017 |
| CN | 106867577 | B | | 4/2018 |
| CN | 11264225 | | * | 4/2021 |
| CN | 112642255 | A | * | 4/2021 ............. B01D 53/02 |
| FR | 2 873 711 | A1 | | 2/2006 |
| WO | 02/32810 | A1 | | 4/2002 |
| WO | 02/34863 | A1 | | 5/2002 |
| WO | 2014/006367 | A1 | | 1/2014 |
| WO | 2017/093012 | A1 | | 6/2017 |
| WO | 2020/016806 | A1 | | 1/2020 |

OTHER PUBLICATIONS

Wang, Li et al., "Application of Red Mud in Wastewater Treatment"; MDPI Open Access Journals: Minerals; vol. 9, Issue 5: 281; pp. 1-22; May 7, 2019 (22 pages).

Arensdorf, Joseph et al., "Treatment of Mercaptans in Canadian Condensate"; Proceedings of the SPE International Symposium on Oilfield Chemistry; Paper No. SPE-141217-MS; pp. 1-4; Apr. 11-13, 2001 (4 pages).

Chakraborty, Soma et al., "Effective Removal of Hydrogen Sulfide and Mercaptans in Oilfield Applications"; Proceedings of the SPE International Conference on Oilfield Chemistry; Paper No. SPE-184589-MS; pp. 1-12; Apr. 3-5, 2017 (12 pages).

Joseph, Collin G. et al., "Application of modified red mud in environmentally-benign applications: A review paper"; Environmental Engineering Research 2020; vol. 25, No. 6; pp. 795-806; Dec. 2020 (12 pages).

Shangguan, Ju et al., "Desulfurization behavior of zinc oxide based sorbent modified by the combination of Al2O3 and K2CO3"; Fuel; vol. 108; pp. 80-84; Jun. 2013 (5 pages).

Tajizadegan, Hamid et al., "Novel ZnO—Al2O3 composite particles as sorbent for low temperature H2S removal"; Chinese Chemical Letters; vol. 24, Issue 2; pp. 167-169; Feb. 2013 (3 pages).

Office Action issued in corresponding Saudi Arabian Application No. 122431340; dated Nov. 12, 2024 (16 pages).

* cited by examiner

ROBUST AND SUSTAINABLE CHEMICAL TREATMENT FOR SULFUR CONTAMINANTS IN FEED NATURAL GAS

BACKGROUND

An increase in production of natural gas liquids (NGL), liquid petroleum gas (LPG), and liquid natural gas (LNG) from prolific sulfur-bearing hydrocarbons worldwide has led to an emission of volatile methylated mercaptan sulfur (e.g., $CH_3SH$, $C_2H_5SH$), gaseous sulfides such as COS, $CS_2$, and their redox intermediate contaminants (including $H_2S$, $HS^-$, $S_n^{2-}$) as pollutants from natural gas production.

The processing of natural gas streams in many oil and gas industries often encounters problems with feed gas containing high levels of volatile methylated mercaptan sulfur (VMMS) compounds and hydrogen sulfides ($H_2S$). As such, it is critical to remove these contaminants from these streams. Failure to remove sulfur impurities from natural gas products can (1) reduce the market value, (2) result in catalyst poisoning within the hydrocarbon treatment process, (3) cause health, safety, and environmental hazards within the gas plant, and (4) compromise facility reliability and lead to corrosion of downstream equipment.

VMMS contaminants in natural gas production may be harmful products, which pose serious potential environmental concerns in the hydrocarbon industries. Their potential emission into the atmosphere also decreases cloud condensation nuclei (CCN) leading to cloud albedo interactions and global warming scenarios. In addition, mercaptans can cause additional corrosion concerns as well as natural gas specification issues for sales gas. For instance, high mercaptan content increases the total sulfur in the stream, which is often limited by a sales gas specification.

Conventionally, NGL, LPG and LNG produced from natural gas streams are generally treated with caustic agents to remove VMMS contaminants followed by amine treatment to remove hydrogen sulfide impurities. However, in this process, a significant amount of the caustic agents, amines, and excessive water can be carried over along with gas streams in process units. This carryover can result in products that do not meet the requisite specifications or result in other chemical compatibility and operational problems in the gas treatment units. For example, excessive water is a significant contaminant that can cause processed natural gas to be off-specification.

Accordingly, when considering environmental and health issues as well as high costs associated with NGL/LNG/LPG production, there exists a need for a strategy for converting an ecofriendly and low-cost material into an adsorption technology that could reduce environmental pollution and operational costs of NGL/LNG/LPG production in the oil and gas industries.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for removing sulfur contaminants from a gas stream including contacting a gas stream comprising hydrocarbons and sulfur contaminants with a modified nanocomposite adsorbent. Thet modified nanocomposite adsorbent may include a waste bauxite residue doped with zinc oxide nanoparticles, where the contacting of the gas stream with the modified nanocomposite adsorbent reduces an amount of sulfur contaminants in the gas stream.

In another aspect, embodiments disclosed here relate to a modified nanocomposite adsorbent composition for removing sulfur contaminants from a hydrocarbon stream. The modified nanocomposite adsorbent composition may include zinc oxide nanoparticles disposed on a waste bauxite residue, where the waste bauxite residue includes a first plurality of major minerals selected from the group consisting of calcium silicate, cancrinite, iron oxide, iron-oxide-hydroxide, or a combination thereof. The modified nanocomposite adsorbent composition may include the waste bauxite residue that includes the first plurality of major minerals in an amount of at least 60% by weight with respect to the total weight of the bauxite waste residue.

In yet another aspect, embodiments disclosed here relate to a process for forming an adsorbent for removing sulfur impurities from a hydrocarbon stream, where the process includes mixing a waste bauxite nanopowder with ethanol and an aqueous zinc nitrate solution to form a reaction mixture, and then increasing a temperature of the reaction mixture to a temperature of greater than 40° C. to 55° C. to obtain a slurry solution. The process may further include adding sodium hydroxide to the slurry solution to adjust a pH of the slurry solution to a pH in the range from about 13 to about 13.8 to convert the zinc nitrate to zinc oxide and forming a mercaptobauxinol adsorbent system (MAS) include a nanocomposite bauxite adsorbent doped with zinc oxide nanoparticles.

In another aspect, embodiments disclosed here relate to a system for removing sulfur impurities from a gaseous hydrocarbon stream, where the system includes a plurality of adsorbent vessels arranged in series. The system may include adsorbent vessels that contain an emulsion of a modified bauxite adsorbent and a gas distributor disposed within each adsorbent vessel where the distributor is configured to introduce a gaseous hydrocarbon feed contaminated with sulfur impurities into the emulsion. The system may further include a gas chromatography system configured to sample and measure a composition of a vapor product stream recovered from one or more of the plurality of adsorbent vessels.

Other aspects and advantages of the claimed subject matter will be apparent from the following description and the appended claims.

DETAILED DESCRIPTION

Figure 1:
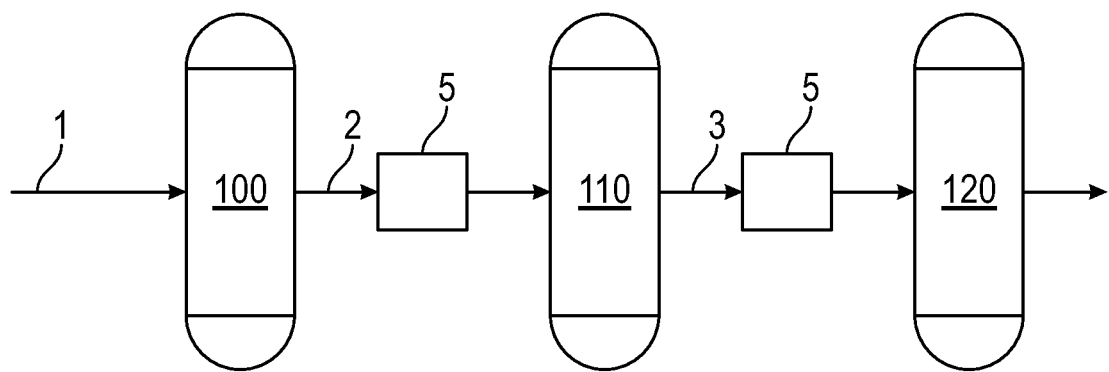
FIG. 1 shows a schematic of a three-staged adsorption treatment apparatus according to one or more embodiments of the present disclosure.

In one aspect, embodiments disclosed herein relate to compositions and methods for producing a nanocomposite of bauxite waste nanopowder that may be doped with zinc nanoparticles. In one or more embodiments, the prepared nanocomposite of bauxite waste nanopowder that may be doped with zinc nanoparticles may be referred to as modified nanocomposite bauxite adsorbent.

Embodiments of the present disclosure relate generally to the removal of impurities of hydrocarbon streams, and to the removal of impurities of natural gas streams for use in the production of natural gas liquid products. Specifically, embodiments of the present disclosure relate to the use of modified nanocomposite bauxite adsorbents to remove impurities from hydrocarbon streams. In one or more embodiments, the nanocomposite of bauxite waste nanopowder doped with zinc nanoparticles may serve as an adsorbent for the removal of volatile methylated mercaptan sulfur and other gaseous sulfide contaminants, such as volatile methyl mercaptans (VMMS), hydrogen sulfides ($H_2S$), $HS^-$, $S_n^{2-}$ and $S_8$, from natural gas streams.

One or more embodiments of the present disclosure relate to adsorptive capturing treatment processes for removing volatile methylated mercaptan sulfur and their gaseous sulfide contaminants, including, but not limited to, $H_2S$ and $HS^-$, from hydrocarbon feeds stream, including natural gas streams, with the modified nanocomposite bauxite adsorbents.

In another aspect, embodiments disclosed herein relate to a flow-through apparatus that may be used to determine the adsorption efficiency and performance of an adsorbent, such as the adsorbent prepared from nanocomposite bauxite waste nanopowders doped with zinc nanoparticles. Embodiments of the present disclosure also relate to the re-use of bauxite waste residue that may be synthesized or modified (doped) with Zn oxide nanoparticles and applied as an alternative material for treatment of volatile methylated sulfur compounds and hydrogen sulfides in natural gas refineries.

Nanocomposite Bauxite Nanopowder Composition

One or more embodiments of the present disclosure may be directed to the re-use of bauxite waste residue as an alternative material for treatment of volatile methylated sulfur compounds and hydrogen sulfides in natural gas refineries. The bauxite waste residue may be characterized as having high concentrations of aluminum oxides, iron oxides, silica oxides, other metal oxides, and high hydroxides content. In one or more embodiments the nanocomposite adsorbent may further comprise zinc oxide nanoparticles disposed on the waste bauxite residue.

Bauxite waste residues are an industrial waste product that are readily available. The residues, which may commonly be referred to as "red mud," may be acquired as Bayer process tailings or bauxite process tailings generated from alumina production, where bauxite is typically digested in heated sodium hydrozide solutions via the Bayer process.

In one or more embodiments the elemental composition of the bauxite residue may include a combination of a plurality of major elements and trace elements. In one or more embodiments, the plurality of major elements and trace elements may be selected from elements including alkali metals, alkaline earth metals, transition metals, post transitional metals, metalloids, nonmetals, or combinations thereof. In some embodiments, the plurality of majority elements may include one or more of Fe, Al, Na, Si, and Ca. In some embodiments, the plurality of trace elements may include one or more of Ti, S, Zn, Mg, Sr, P, Cr, K, Mn, Ce, Pb, Ni, Th, and combinations thereof.

In one or more embodiments, the bauxite waste residue may comprise one or more major elements in an amount ranging from 80 percent by weight (wt %) to 98 wt %, relative to the total weight of the bauxite waste residue. In one or more embodiments, the bauxite waste residue may comprise one or more major elements in an amount ranging from 80, 85, 88, 90, and 93 wt % to 90, 92, 94, 96, and 98 wt %, relative to the total weight of the bauxite waste residue. In one or more embodiments, the bauxite waste residue may comprise Fe and Al in an amount greater than 50 wt %, relative to the total weight of the bauxite waste residue.

In one or more embodiments, the bauxite waste residue may comprise one or more trace elements in an amount ranging from 2 percent by weight (wt %) to 20 wt %, relative to the total weight of the bauxite waste residue. In one or more embodiments, the bauxite waste residue may comprise one or more trace elements in an amount ranging from 2, 2.2, 2.5, 3, 3.5, and 4 wt % to 3, 4, 5, 6, 10, and 20 wt %, relative to the total weight of the bauxite waste residue. In one or more embodiments, the bauxite waste residue may comprise Ti and S in an amount greater than 3 wt %, relative to the total weight of the bauxite waste residue.

In one or more embodiments, the waste bauxite residue may comprise a first plurality of major minerals selected from the group of calcium silicate (in the form of larnite), cancrinite, iron oxide, iron-oxide-hydroxide, or a combination thereof. The waste bauxite residue may comprise a second plurality of minor minerals selected from the group of calcium carbonate (present as calcite), perovskite, grossite, quartz, gibbsite, or a combination thereof.

In one or more embodiments, the bauxite waste residue may comprise one or more major minerals in an amount ranging from 75 wt % to 90 wt %, relative to the total weight of the bauxite waste residue. In one or more embodiments, the bauxite waste residue may comprise one or more major minerals in an amount ranging from 75, 78, 80, 83, 85, and 87 wt % to 80, 82, 84, 86, 88 and 90 wt %, relative to the total weight of the bauxite waste residue. In one or more embodiments, the bauxite waste residue may comprise one or more major minerals including larnite, cancrinite and hematite, in an amount greater than 60 wt %, relative to the total weight of the bauxite waste residue.

In one or more embodiments, the bauxite waste residue may comprise one or more minor minerals in an amount ranging from 10 wt % to 25 wt %, relative to the total weight of the bauxite waste residue. In one or more embodiments, the bauxite waste residue may comprise the one or more minor minerals in an amount ranging from 10, 11, 13, 15, 17, and 19 wt % to 13, 15, 17, 20, 23, and 25 wt %, relative to the total weight of the bauxite waste residue. In one or more embodiments, the bauxite waste residue may comprise calcite, perovskite, and grossite in an amount greater than 10 wt %, relative to the total weight of the bauxite waste residue.

In one or more embodiments, the bauxite adsorbent material may be doped with Zn nanoparticles. In one or more embodiments, the Zinc nanoparticles may have a diameter ranging from 30 nanometers (nm) to 50 nm. In one or more embodiments, the bauxite adsorbent material may comprise Zn nanoparticles in an amount ranging from 20 wt % to 45 wt %, such as 25 wt % to 40 wt %, based upon the total weight of the bauxite adsorbent material.

Preparation of Modified Nanocomposite Bauxite Adsorbent Doped with Zinc Oxide

In accordance with one or more embodiments, waste bauxite nanopowders may be comprised of waste bauxite particles ranging from 25-80 nm in diameter. The ultrafine nanocomposite bauxite adsorbent doped with zinc oxide nanoparticles, which may also be referred to as "mercaptobauxinol adsorbent" or "modified nanocomposite adsorbent" throughout this disclosure, may be fabricated via a multistep reaction as follows.

In one or more embodiments, the obtained dried waste bauxite residue is pulverized, such as in a vibrating sieve shaker machine, to form a bauxite nanopowder. The modified nanocomposite bauxite adsorbents may then be prepared by transferring the sieved bauxite nanopowder to a reactor. In one or more embodiments the reactor may be equipped with a reflux condenser, a means of monitoring and controlling the temperature, and inlet valves for the addition of an homogenized ethanol solution that may be mixed with an aqueous solution of $Zn(NO_3)_2 \cdot 6H_2O$, such as 1.2 M $Zn(NO_3)_2 \cdot 6H_2O$.

Once mixed, the temperature of the reaction may then be raised to greater than 40° C., while applying agitation to the mixture, for about an hour to obtain a reddish slurry solution. Next, the pH of the homogeneous mixture can be adjusted to a more basic range, such as from about 13 to 13.8, by addition of an aqueous solution of NaOH. The addition of a high concentration of NaOH may aid in accelerating the reaction rates leading to instantaneous oxidative formation of $Zn(OH)_2$ as intermediate products, formed by the reaction of $Zn(NO_3)_2$ and NaOH. Further addition of NaOH along with stirring then yields ZnO nanoparticles phases, as shown in Equation 1. Upon completion of the NaOH dosing, the reaction can then be allowed to proceed to obtain an ultrafine nanocomposite adsorbent doped with zinc oxide nanoparticles in the form of a micro-emulsion.

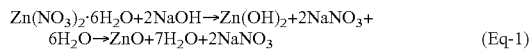

$$Zn(NO_3)_2 \cdot 6H_2O + 2NaOH \rightarrow Zn(OH)_2 + 2NaNO_3 + 6H_2O \rightarrow ZnO + 7H_2O + 2NaNO_3 \quad \text{(Eq-1)}$$

The recovered mercaptobauxinol adsorbent system is provided in the form of a micro-emulsion comprising the bauxite nanocomposite doped with zinc oxide nanoparticles. The micro emulsion provides additional protection during VMMS chemical adsorption, while also mitigating particle nucleation and aggregation processes. The ultrafine nanocomposite adsorbent doped with zinc oxide nanoparticles present within the emulsion display a predominantly acicular rod-like morphology with an hexagonal interpenetrating wurtzite crystal structure of ZnO nanoparticles displaced by the length of cation-anion bond in the C-direction of the nanocomposite nanoparticle.

In other embodiments, the above-described mercaptobauxinol adsorbent system may include a mixture of the modified nanocomposite adsorbent and ethanol. In some embodiments, the mercaptobauxinol adsorbent system may include a mixture of the modified nanocomposite adsorbent and ethanol, where the ethanol may be present in an amount in a range from about 3 wt % to about 20 wt % of the mixture, such as from about 5 wt % to about 15 wt % or from about 8 wt % to about 12 wt %, such as about 10 wt % ethanol. Ethanol, in combination with temperature, has been found to enhance the micro-emulsion properties of the adsorbent, and may help in the overall VMMS transformation and chemical adsorption steps, as well as to increase a pore volume of the adsorbent, thus increasing the adsorption capacity of the modified nanocomposite adsorbent.

Mercaptobauxinol adsorbent systems formed in accordance with embodiments herein have been found effective for concurrently removing $H_2S$ and VMMS contaminants from a gaseous hydrocarbon stream.

Method for Removal of Sulfur-Based Impurities

One or more embodiments of the present disclosure may include a process for withdrawing hydrocarbons from a formation, such as natural gas, crude oil, or other hydrocarbons commonly found in hydrocarbon bearing formations, where the produced hydrocarbons may include a gas portion containing sulfur impurities including, but not limited to, $H_2S$ and VMMS. Methods may also include producing a natural gas fraction from the hydrocarbon stream where the produced hydrocarbons include a gas stream comprising sulfur impurities including, but not limited to, $H_2S$ and VMMS, and further contacting the hydrocarbon gas stream containing the sulfur-based impurities with a modified nanocomposite adsorbent.

In one or more embodiments of the present disclosure, methods may include removing water from the gas stream and contacting the dried gas stream with the modified nanocomposite adsorbent to remove both $H_2S$ and VMMS, either separately or simultaneously.

In one or more embodiments of the present disclosure, with respect to adsorption, methods for removal of sulfur containing impurities may be accomplished by introducing a hydrocarbon gas stream containing the sulfur compounds into a contaminant removal unit, where the contaminant removal unit may include an adsorption zone containing an adsorbent material. Operating conditions of the adsorption zone may include temperatures up to about 150° C. In one or more embodiments, conditions of the adsorption zone may include temperatures from about −30° C. to about 150° C., 1° C. to about 100° C., 5° C. to about 100° C., or 1° C. to about 25° C. Suitable pressures are from about atmospheric pressure to about 1000 psig (6894 kPa), preferably from about atmospheric pressure to about 250 psig (1,724 kPa). The bed of adsorbent material can be of any suitable arrangement including a fixed bed, slurry bed, or moving bed. In one or more embodiments, the adsorbent material may be provided as an emulsion within a vessel that allows both VMMS reactants and hydrocarbons to continuously flow via gravity or bubble through the agitated micro-emulsion adsorbent.

In some embodiments, the methods for removal of sulfur containing impurities may include a single contacting stage. In other embodiments, methods for removal of sulfur containing impurities may include a contacting step including two or more contact stages. For example, one or more embodiments may include a three-stage contact system, as shown in FIG. 1. The three-stage contact system, according to one or more embodiments, can be implemented for large-scale treatment of sulfur-bearing natural gas products in a cooled-thawed process, depending upon the operation temperature, flow rate and feed gas concentrations of total VMMS and hydrogen sulfide levels.

As shown in the exemplary embodiment of FIG. 1, the three-stage contact system includes a first stage where a sulfur-containing feedstock 1, such as a natural gas, is directed to a first capturing trap 100 where the first capturing trap 100 includes a modified nanocomposite adsorbent according to embodiments herein. In the first capturing trap 100, the sulfur-containing feedstock 1 is introduced and contacted with modified nanocomposite adsorbent to reduce hydrogen sulfides and VMMS contaminants in the sulfur-containing feedstock 1.

In one or more embodiments, the operating conditions of the first stage capturing trap may include temperatures from about −10° C. to about 10° C., or −5° C. to about 5° C., or −2° C. to about 2° C., or 0° C. to about 1° C. In one or more embodiments, the operating conditions of the first stage capturing trap may include pressures from about 560 psig (3,861 kPa) to about 712 psig (4,909 kPa), 560 psig (3,861 kPa) to about 600 psig (4,137 kPa), or 600 psig (4,137 kPa) to about 712 psig (4,909 kPa).

Continuing with FIG. 1, the three-stage contact system includes a second stage where the first stage treated natural gas 2 may be directed to a second capturing trap 110. In some embodiments, the contact system may include an interstage drying step, where the second stage treated natural gas 2 may be directed to a drying tube 5 or a vessel containing a drying adsorbent, and then to a second capturing trap 110. The second capturing trap 110 includes the modified nanocomposite adsorbent. In the second capturing trap 110, the first stage treated natural gas 2 is introduced and contacted with modified nanocomposite adsorbent to reduce any persisting hydrogen sulfides and VMMS contaminants in the first stage treated natural gas 2.

In one or more embodiments, the operating conditions of the second stage capturing trap may include temperatures from about −5° C. to about 15° C., or 0° C. to about 10° C., or 2° C. to about 8° C., or 4° C. to about 5° C. In one or more embodiments, the operating conditions of the second stage capturing trap may include pressures from about 350 psig (2,413 kPa) to about 500 psig (3,447 kPa), 350 psig (2,413 kPa) to about 410 psig (2,827 kPa), or 450 psig (3,103 kPa) to about 500 psig (3447 kPa).

The exemplary three-stage contact system includes a third stage where the second stage treated natural gas 3 is directed to a third capturing trap 120. In some embodiments, the contact system may include an interstage drying step, where the second stage treated natural gas 3 may be directed to a drying tube 5, and then to a third capturing trap 120. The third capturing trap 120 includes the modified nanocomposite adsorbent where the adsorbent is mixed with a homogenous ethanol solution. In the third capturing trap 120, the second stage treated natural gas 3 is introduced and contacted with modified nanocomposite adsorbent to reduce any remaining hydrogen sulfides and VMMS contaminants in the second stage treated natural gas stream 3.

In one or more embodiments, the operating conditions of the third stage capturing trap may include temperatures from about 15° C. to about 35° C., or about 20° C. to about 30° C., or 24° C. to about 26°. In one or more embodiments, the operating conditions of the third stage capturing trap may include pressures from about 200 psig (1,379 kPa) to about 300 psig (2,068 kPa), 200 psig (1,379 kPa) to about 260 psig (1,793), or 280 psig (1,931 kPa) to about 300 psig (2,068 kPa).

Hydrocarbon Feeds

In accordance with one or more embodiments, produced hydrocarbons may be contacted with a modified nanocomposite adsorbent. The produced hydrocarbon stream to be processed may include a natural gas fraction or may be comprised of a majority of natural gas. The hydrocarbon stream may include a $C_6$− fraction. In some embodiments, the hydrocarbon stream may include more than about 50% by weight methane, ethane, propane, butane, and pentane, or combinations thereof, including NGL, LPG, and LNG, among others. Mercaptobauxinol adsorbent systems according to embodiments herein may also be useful in removing sulfur contaminants in various other hydrogen or hydrocarbon streams as may be encountered, for example, during various refining stages during processing of crude oils or fractions thereof.

In one or more embodiments the hydrocarbon feed stream may include sulfur containing impurities, where methods of the present disclosure can be used to remove and/or reduce the level of sulfur containing impurities and residual mercaptans. In one or more embodiments the modified nanocomposite adsorbent may reduce one or more of the sulfur comprising impurities via reactive adsorption of the sulfur comprising impurities from the hydrocarbon stream, where said reduction is measured as a difference in the mol % of the sulfur impurities present in the hydrocarbon stream before and after treatment with the modified nanocomposite adsorbent.

In one or more embodiments, the modified nanocomposite adsorbent may reduce one or more of the sulfur impurities by 95 mol % or more. In one or more embodiments the modified nanocomposite adsorbent may reduce one or more of the sulfur impurities by 97 mol % or more. In one or more embodiments the modified nanocomposite adsorbent may reduce one or more of the sulfur impurities by 98 mol % or more.

In one or more embodiments, sulfur containing impurities of the hydrocarbon feedstocks may include, but are not limited to, volatile methylated sulfur compounds such as methyl mercaptans (MeSH—$CH_3SH$), dimethyl sulfide (DMDS—$CH_3SCH_3$), dimethyl disulfide (DMDS—$CH_3SSCH_3$), ethyl mercaptan (EtSH—$C_2H_5SH$), isopropyl mercaptan ($iC_3SH$—$C_3H_7SH$), and isobutyl mercaptan ($iC_4SH$—$C_4H_9SH$), and analogous organosulfur compounds (such as carbonyl sulfides—COS, carbon disulfides—$CS_2$), as well as gaseous sulfides and intermediate contaminants including $H_2S$, $HS^-$, $S_n^{2-}$.

System Apparatus for Testing and Treatment

Figure 2:
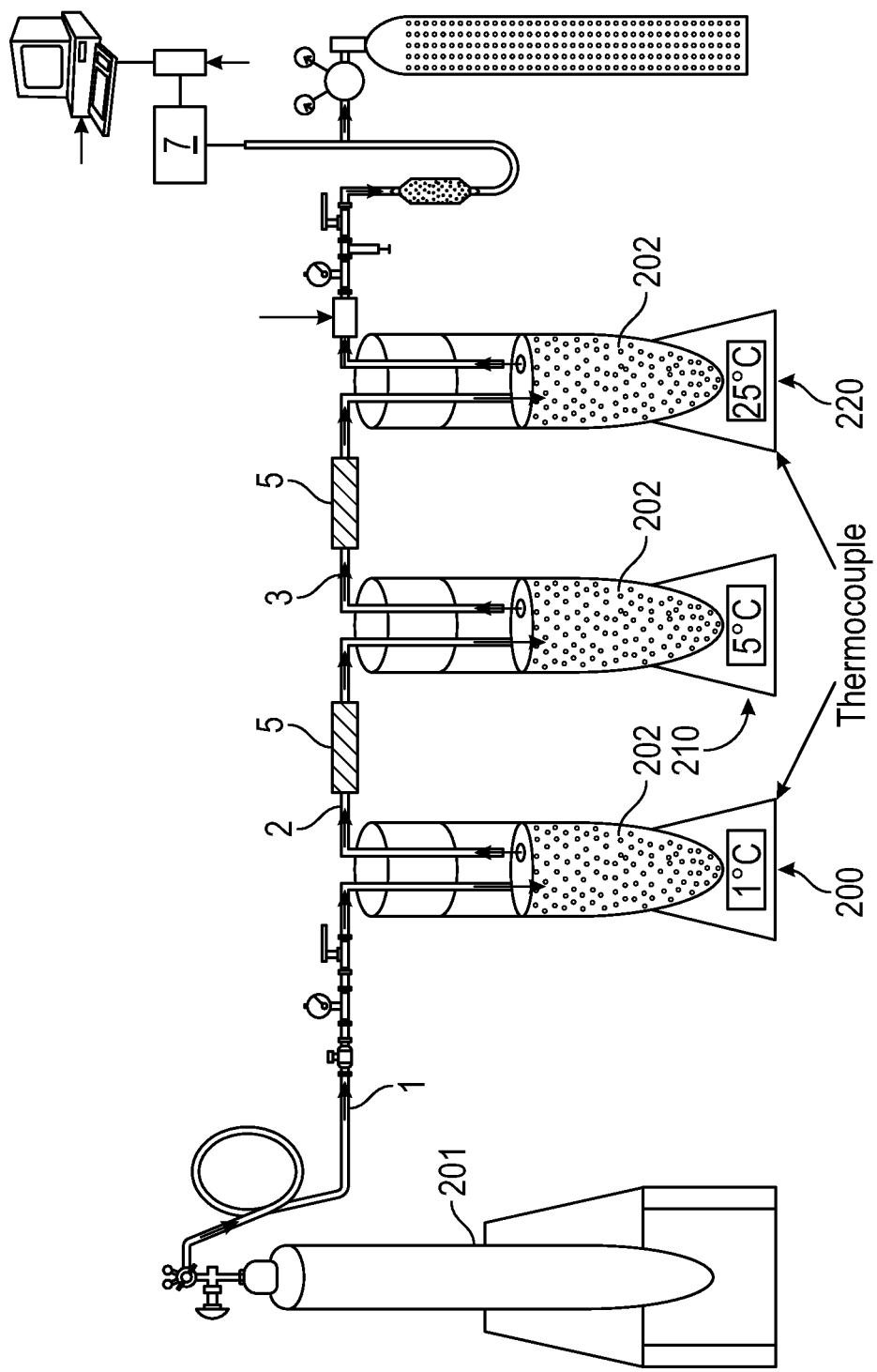
FIG. 2 shows a schematic flow-through adsorption treatment apparatus according to one or more embodiments of the present disclosure.

One or more embodiments of the present disclosure also relates to a system comprising a three-stage multi-component flow through apparatus. As shown in the exemplary embodiment of FIG. 2, the flow through apparatus of one or more embodiments provides for capabilities to evaluate the adsorption and capturing performance of adsorbents, such as the waste bauxite nanocomposite adsorbent of embodiments herein, for application in natural gas processing systems. The apparatus, as shown in FIG. 2, comprises three sequential capturing traps 200, 210, and 220. Each capturing trap contains a quantity of the modified nanocomposite adsorbent 202, either with or without ethanol. The capturing traps 200, 210, and 220, are made of double-jacketed glass reactors with stainless steel flow lines connected with various pressure regulators, gauges, and drying tubes 5. The system further includes a GC system 7 where a small portion of the treated gas may be directed following treatment in the three-stage reaction system. The system also includes a means for introducing and treating the natural feed gas 1 from the PVT cylinders 201 as illustrated in FIG. 2.

In the apparatus, in accordance with one or more embodiments, the natural gas to be treated is directed from the PVT cylinders 201 through the three-stage trap system where each trap 200, 210, and 220, comprises the modified nanocomposite absorbent 202. The natural gas to be treated is directed from the PVT cylinders 201 through the three-stage trap system at constant flow rate of ranging from 850, 875, 900, 920, and 930 to 900, 910, 920, 930, 940, and 950 mL per hour, where any lower limit may be combined with any mathematically feasible upper limit.

Upon entering the adsorbent traps, or "adsorbent vessels", as shown in FIG. 2, the natural gas feed 1 containing VMMS and gaseous $H_2S$ contaminants is then sequentially captured and removed or reduced from the natural gas feed 1 over a period of about 8 hours. Based on the apparatus and conditions provided herein, VMMS and $H_2S$ contaminants can be efficiently removed from the feed gas via physical adsorption (physisorption), reactive adsorption, and chemical sorption (chemisorption) steps.

From an economic perspective, in one or more embodiments, the apparatus for simultaneous absorptive treatment and capturing of VMMS and $H_2S$ employing the modified nanocomposite adsorbent may be retrofitted to existing impurity removal systems or added to a new impurity removal system as a solution to control excessive gaseous sulfur contaminants. In other embodiments, the apparatus for simultaneous absorptive treatment and capturing of VMMS and H$_2$S employing the modified nanocomposite adsorbent may be used to replace existing or conventional impurity removal systems where the apparatus can be appropriately scaled to process the required quantities of natural gas products.

Figure 3:
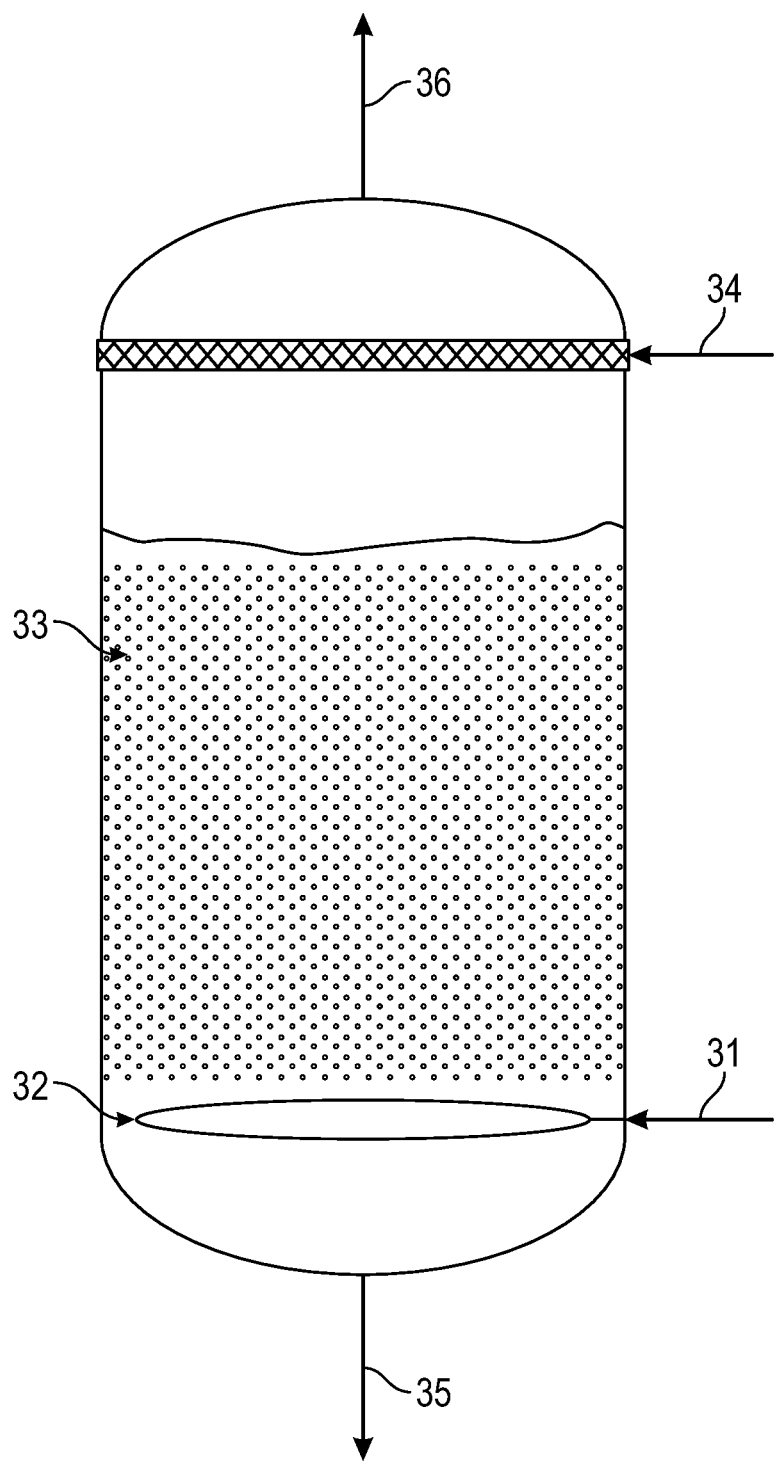
FIG. 3 shows a schematic of an exemplary adsorbent vessel useful with the adsorbents according to embodiments herein.

In one or more embodiments, one or more adsorbent vessels as illustrated in FIG. 3 may be used to facilitate impurity removal using the modified nanocomposite adsorbents herein. The exemplary adsorbent vessel of FIG. 3 is a cylindrical vessel that includes an inlet 31 that leads to a gas distributor 32 near the bottom that serves to bubble the sulfur-containing gas through the absorbent emulsion 33; alternatively, a dip tube, such as illustrated in FIG. 2 may be used to introduce the gaseous flow within the emulsion. The vessel is configured such that vapor recovery can occur at the top of the adsorbent vessel. A demister 34 is positioned at the top of the vessel, or in the gas outlet 36, to avoid entrainment of liquid. The exemplary adsorbent vessel also includes a liquid outlet 35 at the bottom and a gas outlet 36 disposed at the top of the adsorbent vessel. As described above, the one or more adsorbent vessels may be connected in series where the gas outlet of one adsorbent vessel may feed the inlet 31 of a subsequent adsorbent vessel, as shown in FIG. 1.

In one or more embodiments, the system may include a first adsorbent vessel to remove contaminants, and two or more adsorbent vessels may be used to improve the efficiency of contaminant removal, where each of the one or more vessels may comprise an emulsion of the modified nanocomposite adsorbent either with or without additional ethanol. As disclosed above, the one or more adsorbent vessels can be employed in conjunction with or in place of conventional absorbent systems that are currently used and known to one skilled in the art. For example, systems according to embodiments herein, including the nanocomposite adsorbent, may be used as a standalone system, such as for removing sulfur from natural gas streams, or may be used in conjunction with other sulfur removal systems, such as an amine treatment unit, for example, for removing hydrogen sulfide from a hydrogen stream, among others.

EXAMPLES

The following examples are illustrative and should not be interpreted as limiting the scope of the present disclosure.

All glassware and plastic-ware materials used in these examples were acid washed with 10% (V/V) HNO$_3$ and triple rinsed with sterilized 18 MΩ water before use. Zinc nitrate hexahydrate (Zn(NO$_3$)$_2$.6H$_2$O, 99%), ethanol (>99.8%) and NaOH (98.9%) were all acquired from Sigma Aldrich. Waste bauxite residue (pH=13.2) was collected elsewhere, immediately after alumina recovery from the digestions process and stored under anoxic conditions. The mixture contains about 45% of free water and 55% paste materials that were characterized by XRD, as shown in Table 1, and wavelength dispersive X-Ray fluorescence spectroscopy (WDXRF) after being dried at 85° C. for 24 h under nitrogen, as shown in Table 2. The mineralogical composition and elemental composition of waste bauxite residue is provided in Table 1 and Table 2, respectively.

TABLE 1

Mineralogical Composition of Waste Bauxite Residue Estimated by XRD

| Compound | Weight Percentage (Wt %) |
|---|---|
| Larnite (Ca$_2$(SiO$_4$)) | 27 |
| Cancrinite ((Na,Ca)$_8$(AlSiO$_4$)$_6$(CO$_3$SO$_4$)$_2$ H$_2$O) | 22 |
| Hematite (Fe$_2$O$_3$) | 21 |
| Geothite (FeO(OH)) | 15 |
| Calcite (CaCO$_3$) | 5 |
| Perovskite (CaTiO$_3$) | 4 |
| Grossite (CaAl$_4$O$_7$) | 3 |
| Quartz (SiO$_2$) | 2 |
| Gibbsite (Al(OH)$_3$) | 1 |

TABLE 2

Elemental Composition of Waste Bauxite Residue Estimated WDXRF

| Element | Weight Percentage (Wt %) |
|---|---|
| Fe | 30.17 |
| Al | 21.78 |
| Na | 12.19 |
| Si | 14.89 |
| Ca | 10.29 |
| Ti | 2.21 |
| S | 0.9 |
| Zn | 0.73 |
| Sr | 0.52 |
| Mg | 0.4 |
| P | 0.16 |
| Cr | 0.07 |
| K | 0.03 |
| Mn | 0.03 |
| Ce | 0.03 |
| Pb | 0.02 |
| Ni | 0.02 |
| Th | 0.02 |

Synthesis of Ultrafine Bauxite Adsorbent Doped with Zinc Nanoparticles

Waste bauxite nanopowders (ranging from 25-80 nm) were first prepared by pulverizing the dried bauxite residue in a Tencan BZS-200 vibrating sieve shaker machine. 250 grams of the sieved bauxite nanopowders was transferred into a 5 liter double jacketed glass reactor equipped with a reflux condenser, pH meter, thermocouple and double inlets valves for dropwise addition of 500 mL homogenized ethanol mixed with 1.2 M Zn(NO$_3$)$_2$.6H$_2$O aqueous solution upon stirring for 15 mins. The temperature of the reaction was raised to 42° C., while applying magnetic agitation for 1 hour to obtain a reddish slurry solution. The pH of the of the homogeneous mixture was then adjusted to 13.5 by dropwise addition of 27.8 wt. % aqueous solution of NaOH. Addition of high concentration of NaOH accelerates the reaction rates leading to instantaneous oxidative formation of Zn(OH)$_2$ as intermediate products, formed by the reaction of $Zn(NO_3)_2$ and NaOH. Further addition of NaOH upon vigorous stirring yielded ZnO nanoparticles phases as a final component adsorbents mixture according to reaction (Eq-6).

After the NaOH dosing was completed, the reaction was allowed to proceed for 30 min while being stirred to obtain an ultrafine nanocomposite bauxite adsorbent doped with zinc oxide nanoparticles (modified nanocomposite adsorbent). The rheological behavior of the prepared adsorbent was determined in an oscillating rheometer Paar Physica UDS 200 (using a concentric-cylinder configuration approach) and revealed that the final product was a microemulsion with relatively low viscosities, ranging between 42 and 49 cP.

Example 2: Efficiency of Modified-Nanocomposite Bauxite Adsorbent Doped with Zinc Oxide Nanoparticles To investigate the capabilities of the modified nanocomposite adsorbent in natural gas treatment studies, three typified natural gas feeds, denoted as A, B, and C, were obtained to serve as experimental representative feedstocks, and stored in respective pre-cleaned, evacuated, and titanium coated PVT cylinders. The composition of each feedstock was analyzed for hydrocarbon content and volatile methylated mercaptan sulfur (VMMS) contaminants. Flash gas chromatography (GC) techniques coupled with FID was also used to determine the compositions for the major hydrocarbon products in samples A, B, and C, as shown in Table 3.

TABLE 3

| Natural Gas Feedstocks | | | |
| --- | --- | --- | --- |
| Natural Gas Feedstocks | A | B | C |
| Pressure (psig) | 950 | 892 | 850 |
| Temperature (° F.) | 75 | 80 | 72 |
| Composition of Natural Gas | Mol % | Mole % | Mol % |
| Nitrogen—($N_2$) | 0.39 | 0.30 | 0.00 |
| Carbon Dioxide—($CO_2$) | 8.81 | 2.11 | 0.57 |
| Hydrogen Sulfide—($H_2S$) | 14.00 | 1.87 | 5.16 |
| Methane—($CH_4$) | 38.99 | 49.64 | 0.52 |
| Ethane—($C_2H_6$) | 15.08 | 23.10 | 5.26 |
| Propane—($C_3H_8$) | 13.57 | 15.38 | 42.70 |
| i-Butane—($C_4H_{10}$) | 1.64 | 1.65 | 7.80 |
| n-Butane—($C_4H_{10}$) | 5.07 | 3.88 | 27.30 |
| i-Pentane—($C_5H_{12}$) | 0.91 | 0.50 | 4.16 |
| n-Pentane—($C_4H_{12}$) | 1.16 | 0.44 | 4.25 |
| Hexanes—($C_6H_{14}$) | 0.34 | 0.12 | 1.16 |
| Heptanes—($C_7H_{16}$) | 0.04 | 0.01 | 0.11 |
| Octanes—($C_8H_{18}$) | 0 | 0.00 | 0.01 |
| Nonanes—($C_9H_{20}$) | 0 | 0.00 | 0.00 |
| Decanes—($C_{10}H_{22}$) | 0 | 0.00 | 0.00 |
| Total | 100 | 100.00 | 100.00 |
| Specific Gravity (Air = 1.0) | 1.0786 | 0.9593 | 1.7402 |
| Gross Heating Value, (BTU/SCF) | 1,411 | 1,558 | 2,756 |

Volatile methylated mercaptan sulfur (VMMS) contamination levels in the three samples were determined using gas chromatography (GC) as presented in Table 4. Prior to the GC analysis, the gaseous samples present in PVT cylinders were processed by passivating through ¼ inch nickel polish stainless tubing containing a drying agent to remove water and residual air contaminants.

TABLE 4

Volatile methylated mercaptan sulfur contamination levels in typified natural gas products

| Volatile Methylated Sulfur Compounds | Chemical Formula Abbrev. | A Concentration | B Concentration | C Concentration | Units | Boiling Points (° C.) |
| --- | --- | --- | --- | --- | --- | --- |
| Methyl Mercaptan | $CH_3SH$—MeSH | 23.17 | 11.21 | 18.37 | ppm | 6.2 |
| Carbonyl Sulfide | COS | 12.01 | 1.93 | 7.11 | ppm | −50.2 |
| Carbon Disulfide | $CS_2$ | 13.97 | <0.10 | 4.38 | ppm | 46.3 |
| Dimethyl Sulfide | $CH_3SCH_3$—DMS | 9.88 | 7.02 | 11.71 | ppm | 37.3 |
| Dimethyl Disulfide | $CH_3SSCH_3$—DMDS | 5.1 | <0.10 | 6.02 | ppm | 110.1 |
| Ethyl Mercaptan | $C_2H_5SH$—EtSH | 12.63 | 9.58 | 10.03 | ppm | 35.0 |
| Propyl Mercaptan | $C_3H_7SH$—i$C_3SH$ | 9.31 | 5.23 | 5.11 | ppm | 68.0 |
| Isobutyl Mercaptan | $C_4H_9SH$—i$C_4SH$ | 3.86 | 2.02 | 2.99 | ppm | 98.0 |
| N-Butanethiol | $C_4H_{10}S$ | 1.31 | <0.10 | 1.08 | ppm | 97.8 |
| Total Mercaptan Sulfur | VMMS | 91.24 | 36.99 | 66.80 | ppm | N/A |

The GC analytical method was based on Agilent 7890-B application systems that were coupled with both pulsed flame photometric detector (PFPD from OI Analytical) and sulfur selective chemiluminescence detector (SCD). GC conditions: Column=1 micron Agilent DB-1 (60 m×0.320 mm). The carrier gas was helium. The temperature of the oven was maintained at 35° C. for 3 min, after which it was raised from 35 to 250° C. at 5° C./min and kept at constant temperature for 250 min.

After confirming the compositional makeup and sulfur-based contamination levels of the three gas feedstocks, studies of the modified nanocomposite adsorbent were then carried out to determine whether the modified nanocomposite adsorbent could efficiently remove VMMS and gaseous hydrogen sulfide from natural gas streams.

The apparatus, as described in one or more embodiments, included a three-stage system with three sequential capturing traps that were filled with the modified nanocomposite adsorbent, where each capturing trap included double jacketed glass reactors, and where stainless-steel flow lines were connected with pressure regulators, gauges, and drying tubes. The system also included a feed to a GC system and a means for introducing and treating the feed gas from the PVT cylinders as illustrated in FIG. 2.

The apparatus and efficiency of the modified nanocomposite adsorbent was tested in triplicate with the three distinct natural gas feedstock samples, A, B, and C, which were collected from the field and stored, as described above.

In the test, the natural gas to be treated was directed from the PVT cylinders through the three-stage absorbent at constant flow rate of 930 mL per hour, as detected using volumetric gas meter. Specific details for the absorptive capturing treatment test for removal of VMMS and $H_2S$ by the three-stage capturing using the modified nanocomposite adsorbent system are as follows.

Figure 4:
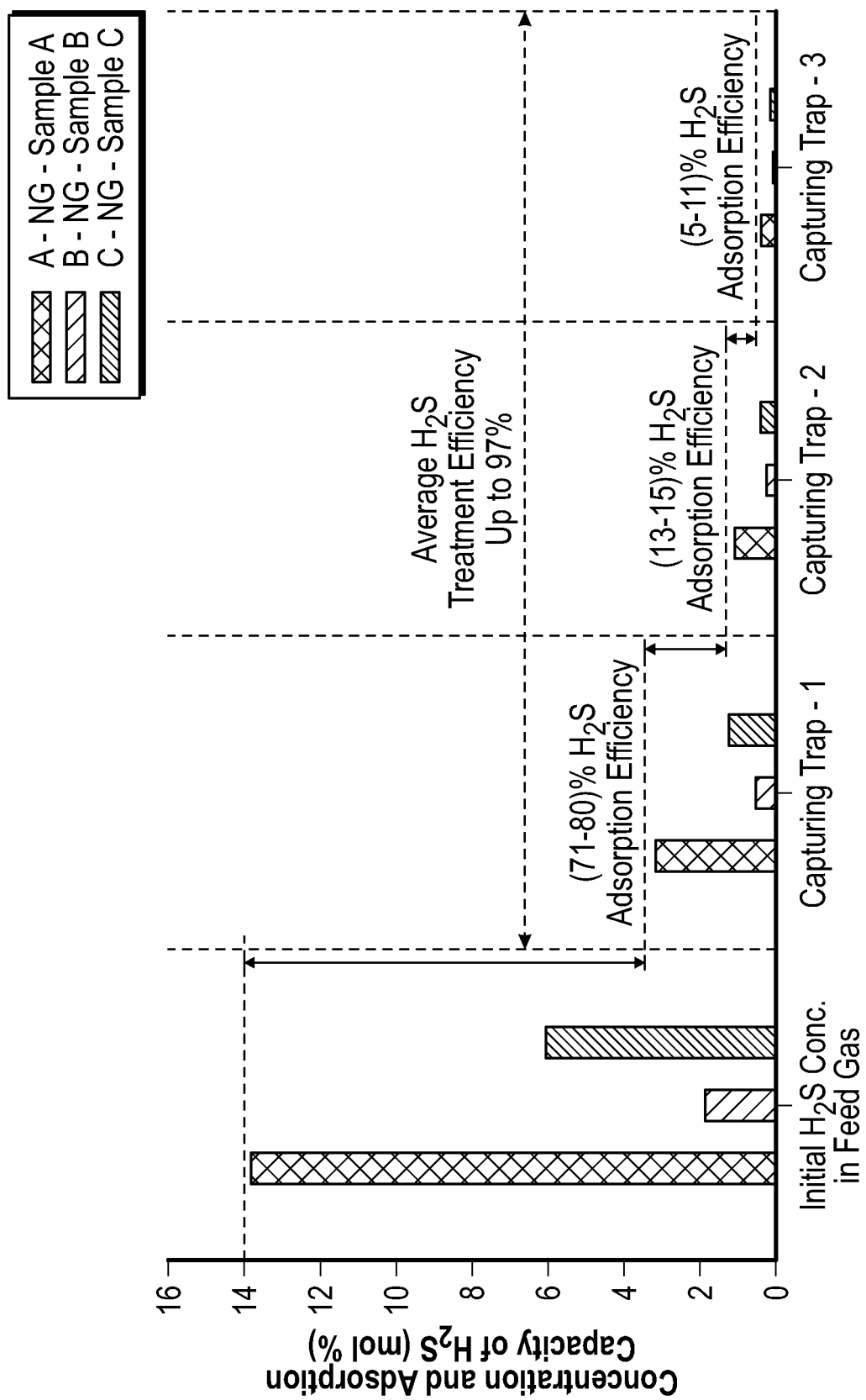
FIG. 4 shows a graph showing the hydrogen sulfide treatment efficiency for feed natural gas samples A, B, and C.
Figure 5:
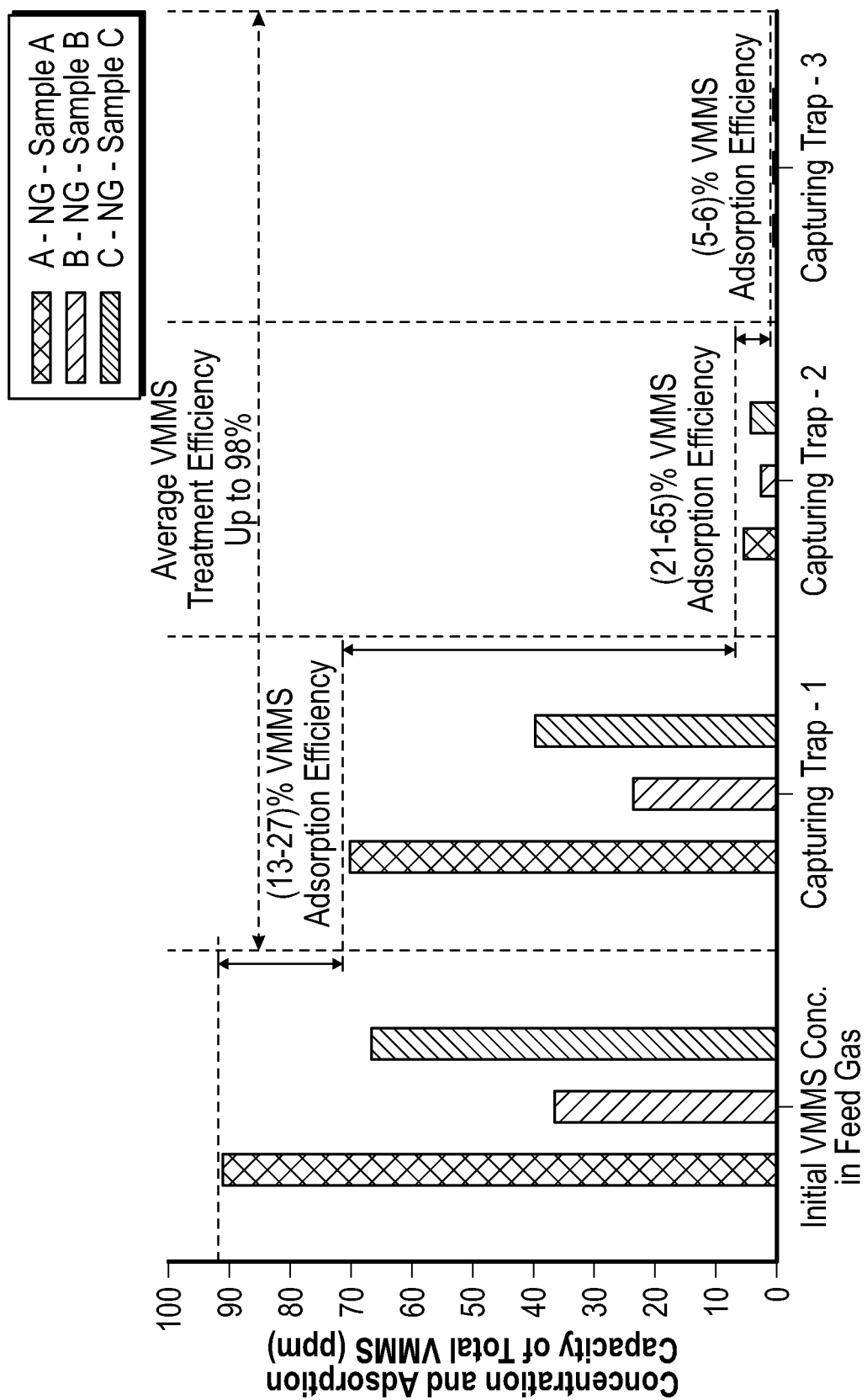
FIG. 5 shows a graph showing the total volatile methylated mercaptan sulfur treatment efficiency for feed natural gas samples A, B, and C.

In the first stage, the gas feed was introduced and contacted with modified nanocomposite adsorbent in the first capturing trap where physical adsorption of VMMS and $H_2S$ occurred. This step was regulated at a temperature of 1° C. and was able to eliminate up to 71-80% of hydrogen sulfides and a portion of VMMS, ranging from 13-27%, within 4 hours, as shown in FIGS. 4 and 5. The specific chemical reactions for this physical adsorption process are summarized in the reactions (Eq 2-5), where each of equations 2-5 represent a step of physical adsorption and where M may be monovalent or divalent metals.

$$H_2S + FeO \rightarrow FeS_{(aq)} + H_2O \qquad (Eq\text{-}2)$$

$$H_2S + ZnO \rightarrow ZnS_{(aq)} + H_2O \qquad (Eq\text{-}3)$$

$$H_2S + H_2O \rightarrow HS^- + H_3O \qquad (Eq\text{-}4)$$

$$HS^- + M^+ \rightarrow MSH \qquad (Eq\text{-}5)$$

Next, the partially desulfurized natural gas containing the VMMS was directed through a drying tube and then into the second capturing reactor trap. Here, the VMMS contaminants underwent a series of redox reactions over a period of at least 30 minutes under basic and oxidative conditions to convert both VMMS and any intermediate sulfide ($HS^-$ and $S^{2-}$ species) impurities via reactive adsorption steps detailed in reactions (Eq. 6-8). As presented in the treatment schematic of FIG. 2, the integration of cooled-thawed process performed at 5° C. beneficially enables the adsorbent to capture the maximum concentration of VMMS contaminants ranging from 21-65%, in addition to residual sulfides remnants (13-15%) as demonstrated in FIGS. 4 and 5.

$$2RSH + O_2 \rightarrow RSSR + H_2O \qquad (Eq\text{-}6)$$

$$RSH + OH^- \rightarrow RS^- + H_2O \qquad (Eq\text{-}7)$$

$$8HS^- + 2M^{n2+} \rightarrow S_8 + 8H^+ + 2M^{(n+1)+} \qquad (Eq\text{-}8)$$

The recovered natural gas from the second trap was then directed to the third adsorption trap at a point near the top of the trap. In this adsorptive capturing step, in addition to the modified nanocomposite adsorbent, a volume of ethanol was added to achieve a total amount of 10% ethanol by volume (vol %), and the temperature of the adsorbents was ramped up to 25° C. to enhance the micro-emulsion properties of the adsorbent. These conditions also facilitate the overall VMMS transformation and chemical adsorption steps presented in reactions (Eq. 9-11).

$$RS^- + S_8 \rightarrow RSS_8^- \qquad (Eq\text{-}9)$$

$$RSS_8^- + RSSR \rightarrow RSS_8SR + RS^- \qquad (Eq\text{-}10)$$

$$2RS^- + M^{2+} \rightarrow 2RSM \qquad (Eq\text{-}11)$$

In addition, these changes also served to increase the pore volume of the adsorbent, resulting in further improvement and an increase of the adsorption capacity of the modified nanocomposite adsorbent to further capture any residual sulfur contaminants present in the feed gas. As shown in FIGS. 4 and 5, between 5-11% of additional sulfur contaminants were captured in this stage. The treated natural gas feed was then directed to a gas purifier chamber that contained a mixture granular tenax, diorite and zeolite to remove traces of water vapor and unwanted hydrocarbon impurities from the treated natural gas. Next, sub-samples of the treated natural gas were separated and injected into the GC-system for quantitative adsorption treatment efficiency analyses to measure VMMS and $H_2S$ levels before storing the natural gas in pre-cleaned gas storage cylinders.

The gas chromatography (GC) was coupled with both pulsed flame photometric detector (PFPD) and sulfur selective chemiluminescence detector (SCD) and was used to analyze all three (A, B, and C) treated natural gas feeds. The overall adsorption and treatment efficiency experiments detailed in Table 5, and presented in FIGS. 4 and 5, showed an average treatment efficiency of 98% and 97% respectively, for both total VMMS and gaseous $H_2S$ contaminants. Despite the adsorbent system being characterized by the presence of several ionic species that could form a solid phase, precipitation was generally avoided by operating the absorbent at relative freeze and thawed temperatures below solid-forming conditions.

Upon entering the adsorbent traps, as shown in FIG. 2, the VMMS and gaseous $H_2S$ contaminants present in the feed gas were sequentially captured and removed from the natural gas samples over a period of about 8 hours. Based on the described steps as provided above, VMMS and $H_2S$ contaminants were efficiently removed from the feed gas via physical adsorption (physisorption), reactive adsorption, and chemical sorption (chemisorption) steps from the three traps as summarized in Table 5.

TABLE 5

Total Sulfur-based Impurities Measured Before and After Treatment

|  | Initial Concentration NG Feedstock | Adsorbent Trap - 1 | Adsorbent Trap - 2 | Adsorbent Trap -3 | Overall adsorption treatment efficiency (%) |
| --- | --- | --- | --- | --- | --- |
| Natural Gas Feedstock Sample A |  |  |  |  |  |
| Hydrogen Sulfide (mol %) | 14.00 | 3.22 | 1.07 | 0.38 | 96.29 |
| Total methylated mercaptan (ppm) | 91.24 | 70.62 | 5.83 | 0.99 | 98.91 |
| Natural Gas Feedstock Sample B |  |  |  |  |  |
| Hydrogen Sulfide (mol %) | 1.87 | 0.53 | 0.26 | 0.06 | 96.79 |
| Total methylated mercaptan (ppm) | 36.99 | 24.08 | 3.17 | 0.86 | 97.68 |
| Natural Gas Feedstock |  |  |  |  |  |

TABLE 5-continued

Total Sulfur-based Impurities Measured Before and After Treatment

|  | Initial Concentration NG Feedstock | Adsorbent Trap - 1 | Adsorbent Trap - 2 | Adsorbent Trap -3 | Overall adsorption treatment efficiency (%) |
|---|---|---|---|---|---|
| Sample C |  |  |  |  |  |
| Hydrogen Sulfide (mol %) | 6.16 | 1.21 | 0.37 | 0.09 | 98.54 |
| Total methylated mercaptan (ppm) | 66.80 | 40.17 | 4.83 | 0.91 | 98.04 |

The results show that the VMMS and $H_2S$ reactivity with the modified nanocomposite adsorbent are stable and do not affect the processed natural gas products. The described apparatus and analytical methods employed in this invention can also be used as a routine quality control analysis for total VMMS and gaseous $H_2S$ contaminants due to its specificity and sensitivity to feed natural products.

From an economic perspective, the simultaneous absorptive treatment and capturing of VMMS and $H_2S$ by the developed adsorbent is a feasible retrofitting solution to control excessive gaseous sulfur contaminants in natural gas treatment.

Therefore, as demonstrated, the modified nanocomposite adsorbent system can be advantageously used and may serve as inexpensive and robust process compared to conventional caustic methods. It can be easily implemented for large-scale treatment of sulfur-bearing natural gas products in a cooled-thawed process, and may be dependent upon the operation temperature, flow rate and feed gas concentrations of total VMMS and hydrogen sulfide levels.

Although the preceding description has been described with reference to particular means, materials and embodiments, it is not intended to be limited to the particulars disclosed; rather, it extends to all functionally equivalent structures, methods and uses, such as those within the scope of the appended claims.

The presently disclosed systems, apparatuses, methods, processes and compositions may suitably comprise, consist or consist essentially of the elements disclosed and may be practiced in the absence of an element not disclosed. For example, those skilled in the art can recognize that certain steps can be combined into a single step.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method for removing sulfur contaminants from a gas stream comprising:
   contacting a gas stream comprising hydrocarbons and sulfur contaminants with a modified nanocomposite adsorbent, wherein the modified nanocomposite adsorbent comprises waste bauxite residue doped with zinc oxide nanoparticles,
   wherein the contacting of the gas stream with the modified nanocomposite adsorbent reduces an amount of sulfur contaminants in the gas stream.

2. The method of claim 1, wherein the gas stream is a natural gas comprising more than 50 wt % methane, ethane, propane, butane, and pentane, or combinations thereof.

3. The method of claim 1, where the sulfur contaminants are at least one or more selected from the group consisting of methyl mercaptans ($CH_3SH$), dimethyl sulfide ($CH_3SCH_3$), dimethyl disulfide ($CH_3SSCH_3$), ethyl mercaptan ($C_2H_5SH$), isopropyl mercaptan ($C_3H_7SH$), isobutyl mercaptan ($C_4H_9SH$), N-butanethiol, carbonyl sulfides (COS), carbon disulfides ($CS_2$), $H_2S$, $HS^-$, $S_n^{2-}$, or a combination thereof.

4. The method of claim 1, wherein the contacting the gas stream with the modified nanocomposite adsorbent reduces a concentration of one or more of the sulfur comprising impurities in the gas stream by 95% or more.

5. The method of claim 1, wherein the modified nanocomposite adsorbent is present in the form of a microemulsion.

6. The method of claim 1, wherein modified nanocomposite adsorbent comprises zinc oxide nanoparticles in an amount from 25 to 40 wt %, relative to the total weight of the modified nanocomposite adsorbent.

7. The method of claim 1, wherein the contacting the gas stream with a modified nanocomposite adsorbent comprises:
   directing the gas stream to a plurality of sequential capturing traps, wherein each of the capturing traps comprises the modified nanocomposite adsorbent,
   wherein the gas stream is contacted with the modified nanocomposite adsorbent within each of the capturing traps.

8. The method of claim 7, wherein plurality of sequential capturing traps includes a first capturing trap, a second capturing trap, and a third capturing trap, and wherein the gas stream is dried in a drying tube at a stage between each capturing trap.

9. The method of claim 8, wherein first, second, and third capturing traps are operated at different temperatures.

10. The method of claim 8, wherein the third capturing trap comprises the modified nanocomposite adsorbent as a mixture with ethanol.

\* \* \* \* \*